(12) United States Patent
Kobayashi et al.

(10) Patent No.: US 9,939,061 B2
(45) Date of Patent: Apr. 10, 2018

(54) HYDRAULIC CONTROL APPARATUS

(71) Applicant: HONDA MOTOR CO., LTD., Tokyo (JP)

(72) Inventors: Shogo Kobayashi, Wako (JP); Tomoaki Mukai, Wako (JP); Shunsuke Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 15/015,121

(22) Filed: Feb. 4, 2016

(65) Prior Publication Data

US 2016/0245400 A1 Aug. 25, 2016

(30) Foreign Application Priority Data

Feb. 23, 2015 (JP) ................. 2015-032920

(51) Int. Cl.
*F15B 1/027* (2006.01)
*F16H 61/02* (2006.01)
*F16H 61/00* (2006.01)

(52) U.S. Cl.
CPC ..... *F16H 61/0276* (2013.01); *F16H 61/0025* (2013.01); *F16H 61/0267* (2013.01); *F15B 1/027* (2013.01); *F16H 2061/0034* (2013.01); *F16H 2061/0279* (2013.01)

(58) Field of Classification Search
CPC .. F15B 1/027; F15B 1/033; F15B 1/03; F16H 61/0276; F16H 61/0025; F16H 61/0267

USPC ........................................... 60/416
See application file for complete search history.

(56) References Cited

U.S. PATENT DOCUMENTS 8,734,293 B1 * 5/2014 Perkarsky ........... F16H 61/0021
477/115

FOREIGN PATENT DOCUMENTS

JP 2008-503695 2/2008

* cited by examiner

*Primary Examiner* — F. Daniel Lopez
*Assistant Examiner* — Daniel Collins
(74) *Attorney, Agent, or Firm* — Mori & Ward, LLP (57) ABSTRACT

A check valve includes a check valve body and a check valve member. The check valve body includes a check valve outlet port and a check valve oil path. The check valve member is movable in the check valve oil path to move in a first direction in which the check valve member is pushed by hydraulic fluid due to hydraulic pressure from a hydraulic pump. A switching valve includes a switching valve body. The switching valve body includes a switching valve inlet port connected to the check valve outlet port and a receiving surface facing the check valve outlet port. The check valve member contacts the receiving surface after the hydraulic pump starts providing hydraulic pressure. The switching valve body is supported by a valve body via a first O-ring and a second O-ring such that the switching valve body is movable in the first direction.

6 Claims, 8 Drawing Sheets

HYDRAULIC CONTROL APPARATUS

CROSS-REFERENCE TO RELATED APPLICATIONS

The present application claims priority under 35 U.S.C. § 119 to Japanese Patent Application No. 2015-32920, filed Feb. 23, 2015, entitled "Hydraulic Control Apparatus of Automatic Transmission." The contents of this application are incorporated herein by reference in their entirety.

BACKGROUND

Field of the Invention

The present disclosure relates to a hydraulic control apparatus.

Description of the Related Art

It is known from Japanese Unexamined Patent Application Publication (Translation of PCT Application) No. 2008-503695 that a parking lock device that impedes movement of a vehicle by preventing an output shaft of an automatic transmission from rotating is manipulated with a hydraulic actuator that is actuated by a hydraulic circuit.

SUMMARY

According to one aspect of the present invention, a hydraulic control apparatus for an automatic transmission includes an engine on which idle-stop control is performed in a predetermined running state; a hydraulic pump that is driven by the engine; an accumulator that stores hydraulic pressure that is to be applied to a hydraulic actuator for the automatic transmission connected to the engine; a first oil passage through which hydraulic pressure from the hydraulic pump is applied to the accumulator; a check valve that is placed in the first oil passage and opened only in a direction in which the hydraulic pressure from the hydraulic pump is applied to the accumulator; a switching valve that is placed between the check valve and the accumulator in the first oil passage and allows the hydraulic pressure from the accumulator to be applied to a second oil passage connected to the hydraulic actuator; and a valve body in which at least the accumulator, the check valve, and the switching valve are accommodated. The switching valve and the check valve are placed such that an axis of a sleeve of the switching valve is perpendicular to an axis of a sleeve of the check valve. The sleeve of the switching valve is supported by the valve body with a pair of O-rings interposed therebetween, which surround the sleeve at positions spaced apart from each other in an axial direction of the sleeve. One end of the sleeve of the check valve is fitted into a recess formed between the pair of O-rings on the sleeve of the switching valve. A valve member of the check valve comes into contact with a bottom of the recess when the check valve is opened.

According to another aspect of the present invention, a hydraulic control apparatus includes a hydraulic actuator, a hydraulic pump, an accumulator, a check valve, a first oil providing route, a switching valve, a second oil providing route, a third oil providing route, a valve body, a first O-ring, and a second O-ring. The hydraulic actuator is to control an automatic transmission. The hydraulic pump is to be driven by an engine to provide hydraulic pressure. The hydraulic actuator is to control an automatic transmission. The hydraulic pressure is supplied to the accumulator while the hydraulic pump provides the hydraulic pressure. The hydraulic pressure stored in the accumulator is provided to the hydraulic actuator while the hydraulic pump does not provide the hydraulic pressure. The check valve is provided between the hydraulic pump and the hydraulic actuator to open while the hydraulic pump provides the hydraulic pressure and to close while the hydraulic pump does not provide the hydraulic pressure. The first oil providing route connects the hydraulic pump to the check valve. The check valve includes a check valve body and a check valve member. The check valve body includes a check valve inlet port, a check valve outlet port, and a check valve oil path. The check valve inlet port is connected to the first oil providing route. The check valve oil path connects the check valve inlet port to the check valve outlet port. The check valve member is movable in the check valve oil path to move in a first direction in which the check valve member is pushed by hydraulic fluid due to the hydraulic pressure from the hydraulic pump to open the check valve inlet port while the hydraulic pump provides the hydraulic pressure. The switching valve is joined to the check valve and provided between the check valve and the hydraulic actuator to open while the engine works and to close while the engine does not work. The second oil providing route connects the switching valve to the hydraulic actuator. The third oil providing route connects the switching valve to the accumulator. The first providing route is connected to at least one of the second oil providing route and the third oil providing route while the check valve is open. The first oil providing route is disconnected from both the second oil providing route and the third oil providing route while the check valve is close. The third oil providing route is connected to at least the second oil providing route while the switching valve is open. The third oil providing route is disconnected from both the first oil providing route and the second oil providing route while the switching valve is close. The switching valve includes a switching valve body. The switching valve body includes a switching valve inlet port, an outer peripheral surface, and a receiving surface. The switching valve inlet port is connected to the check valve outlet port. The switching valve inlet port is provided on the outer peripheral surface. The receiving surface faces the check valve outlet port and is adjacent to the switching valve inlet port. The check valve member contacts the receiving surface after the hydraulic pump starts providing hydraulic pressure. The check valve and the switching valve are provided in the valve body. The valve body includes an inner surface facing the outer peripheral surface of the switching valve. The inner surface of the valve body and the outer peripheral surface of the switching valve provides a gap between the valve body and the switching valve. The first O-ring and the second O-ring are arranged on the outer peripheral surface. The check valve outlet port and the switching valve inlet port are interposed between the first O-ring and the second O-ring to seal the gap. The switching valve body is supported by the valve body via the first O-ring and the second O-ring such that the switching valve body is movable in the first direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment will hereinafter be described with reference to FIGS. 1 to 8.

Figure 1:
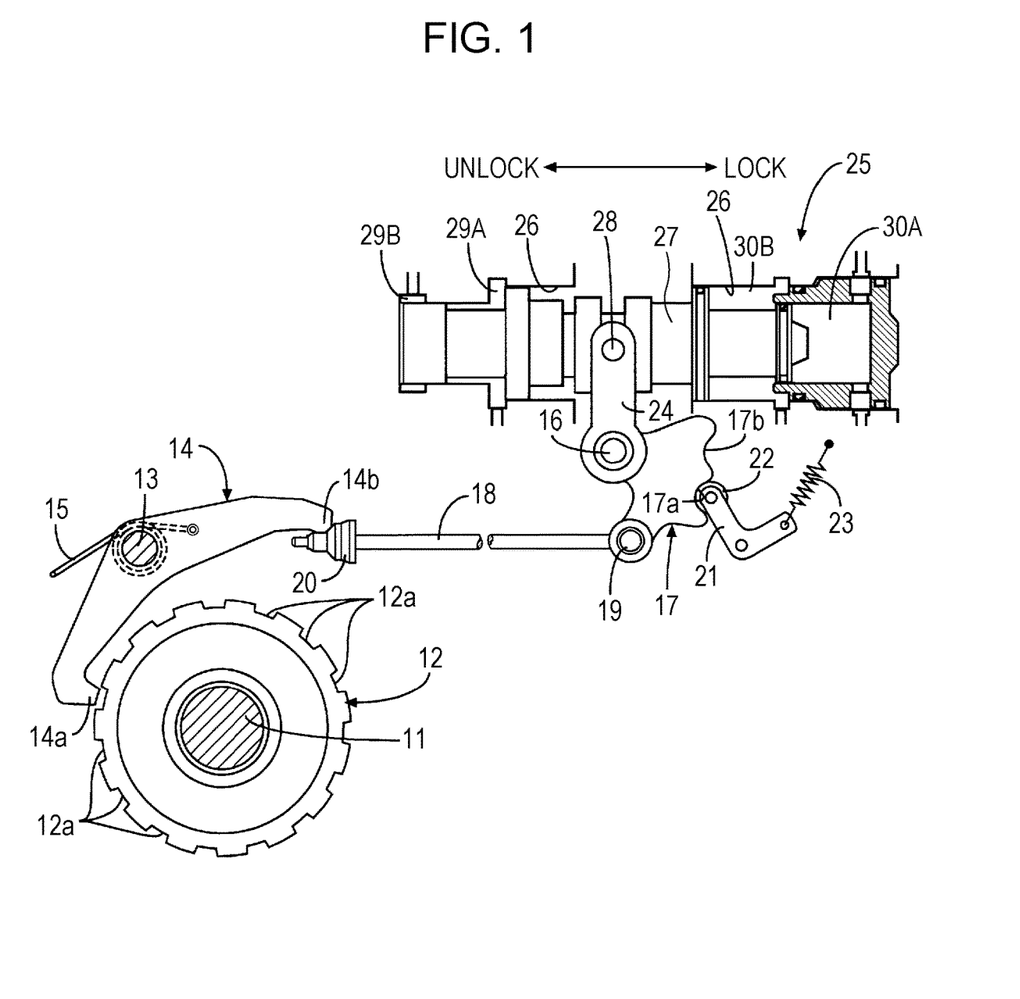
FIG. 1 is a diagram showing a structure of a parking lock device.

The structure of a parking lock device will be first described with reference to FIG. 1.

A parking gear 12 is fixed to a transmission shaft 11 of an automatic transmission. A locking pawl 14a provided at one end of a parking pawl 14 supported in a pivotable manner by a spindle 13 is urged by a spring 15 in a direction in which the locking pawl 14a is disengaged from one of tooth spaces 12a of the parking gear 12. A parking rod 18 is supported at one end thereof in a pivotable manner by a pin 19 on a detent plate 17 supported in a pivotable manner by a spindle 16. A cone-shaped cam 20 provided at the other end of the parking rod 18 comes into contact with a cam follower 14b provided at the other end of the parking pawl 14. A detent roller 22 provided at one end of an arm 21 that can swing is urged by a spring 23 in a direction in which the detent roller 22 engages with either of two recesses 17a and 17b of the detent plate 17. A link 24 that is supported in a pivotable manner by the spindle 16 and swings together with the detent plate 17 is connected to a hydraulic actuator 25.

The hydraulic actuator 25 includes a piston 27 that is fitted into a cylinder 26 such that the piston 27 can slide in the cylinder 26. The link 24 is connected to the piston 27 with a pin 28. A first lock oil chamber 29A and a second lock oil chamber 29B are formed on the left end side of the cylinder 26 to drive the piston 27 in a direction in which a parking lock is actuated (to the right). A first unlock oil chamber 30A and a second unlock oil chamber 30B are formed on the right end side of the cylinder 26 to drive the piston 27 in a direction in which the parking lock is released (to the left).

When hydraulic pressure is applied to the first lock oil chamber 29A and the second lock oil chamber 29B, the piston 27 moves to the right. The movement of the piston 27 is conveyed to the link 24, the detent plate 17, the parking rod 18, and the cam 20 and causes the cam follower 14b of the parking pawl 14 to rise, thereby swinging the parking pawl 14 against an elastic force of the spring 15 and engaging the locking pawl 14a with one of the tooth spaces 12a of the parking gear 12. This actuates the parking lock to suppress the movement of a vehicle. While the parking lock is in an actuated state, the detent roller 22 engages with the recess 17b of the detent plate 17 and this state is stably maintained.

When hydraulic pressure is applied to the first unlock oil chamber 30A and the second unlock oil chamber 30B, the piston 27 moves to the left, and the locking pawl 14a of the parking pawl 14 is disengaged from the tooth space 12a of the parking gear 12. This releases the parking lock, allowing the vehicle to move. While the parking lock is in a released state, the detent roller 22 engages with the recess 17a of the detent plate 17 and this state is stably maintained.

Figure 2:
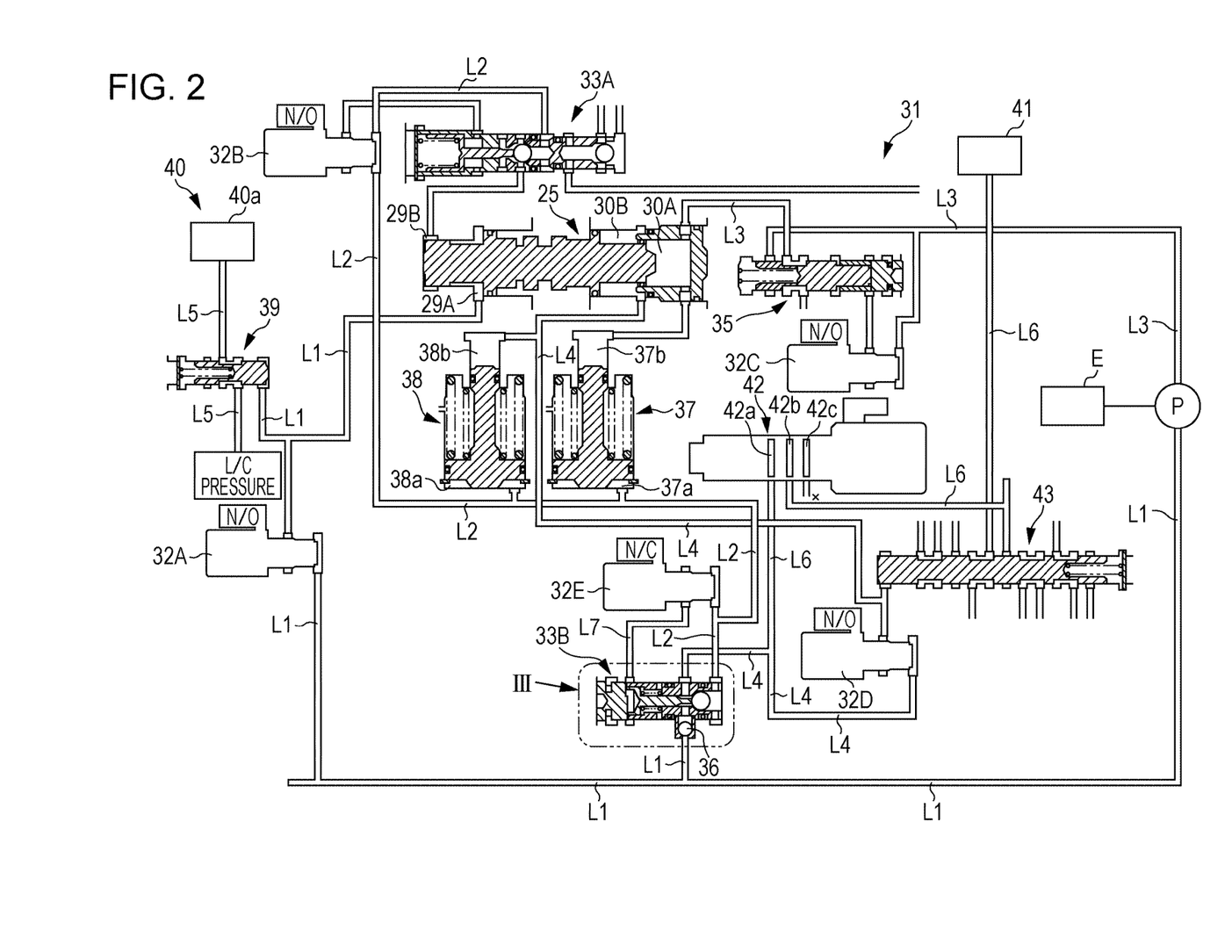
FIG. 2 is a diagram of a hydraulic circuit of the parking lock device.

A hydraulic circuit 31 that controls actuation of the hydraulic actuator 25 will now be described with reference to FIG. 2.

The hydraulic circuit 31 includes an on-off-type solenoid valve 32A that applies, to the first lock oil chamber 29A of the hydraulic actuator 25, line pressure applied from a hydraulic pump P driven by the engine E to an oil passage (a first oil providing route) L1 and an on-off-type solenoid valve 32B that applies, to the second lock oil chamber 29B of the hydraulic actuator 25, the line pressure of an oil passage (a second oil providing route) L2 connected to an intermediate portion of the oil passage L1 through a check valve 36. The solenoid valve 32A when opened directly applies the line pressure to the first lock oil chamber 29A. The solenoid valve 32B when opened causes a first ball valve 33A to open. Both of the solenoid valve 32A and the solenoid valve 32B are of the normally open type.

The hydraulic circuit 31 also includes an on-off-type solenoid valve 32C that applies, to the first unlock oil chamber 30A of the hydraulic actuator 25, the line pressure of an oil passage L3 connected to the hydraulic pump P, and an on-off-type solenoid valve 32D that applies, to the second unlock oil chamber 30B of the hydraulic actuator 25, the line pressure of an oil passage (a third oil providing route) L4 downstream of the check valve 36. The solenoid valve 32D when opened directly applies the line pressure to the second unlock oil chamber 30B. The solenoid valve 32C when opened causes a spool of a parking inhibiting valve 35 to move to the left and allows the line pressure to be applied to the first unlock oil chamber 30A and when closed causes the spool to the right and allows the line pressure of the first unlock oil chamber 30A to be drained. Both of the solenoid valve 32C and the solenoid valve 32D are of the normally open type.

The oil passage L2 between the check valve 36 and the solenoid valve 32B is connected to an accumulating chamber 37a of the first accumulator 37 and an accumulating chamber 38a of the second accumulator 38. A back chamber 37b of the first accumulator 37 communicates with the first unlock oil chamber 30A. A back chamber 38b of the second accumulator 38 communicates with the second unlock oil chamber 30B. The second ball valve 33B that is opened and closed by an on-off-type solenoid valve 32E is placed between the first and second accumulators 37 and 38 and the check valve 36. The solenoid valve 32E when opened causes the second ball valve 33B to open thereby increasing the flow rate of oil. The solenoid valve 32E is of the normally close type.

The oil passage L1 downstream of the solenoid valve 32A is connected to a lockup-clutch shift valve 39. The lockup-clutch pressure of an oil passage L5 is applied to a lockup clutch 40a of a torque converter 40, which is a starting mechanism, via the lockup-clutch shift valve 39.

An oil passage L6 downstream of the check valve 36 is connected to a hydraulic brake 41, which is a hydraulic engaging device to change speed. A linear solenoid valve 42 and a brake cut valve 43 are placed in the oil passage L6. The brake cut valve 43 is driven so as to be opened and closed by the solenoid valve 32D. The linear solenoid valve 42 includes an inlet port 42a, an outlet port 42b, and a drain port 42c and can adjust and output hydraulic pressure inputted from the inlet port 42a through the outlet port 42b and drain the hydraulic pressure inputted from the inlet port 42a through the drain port 42c.

Figure 3:
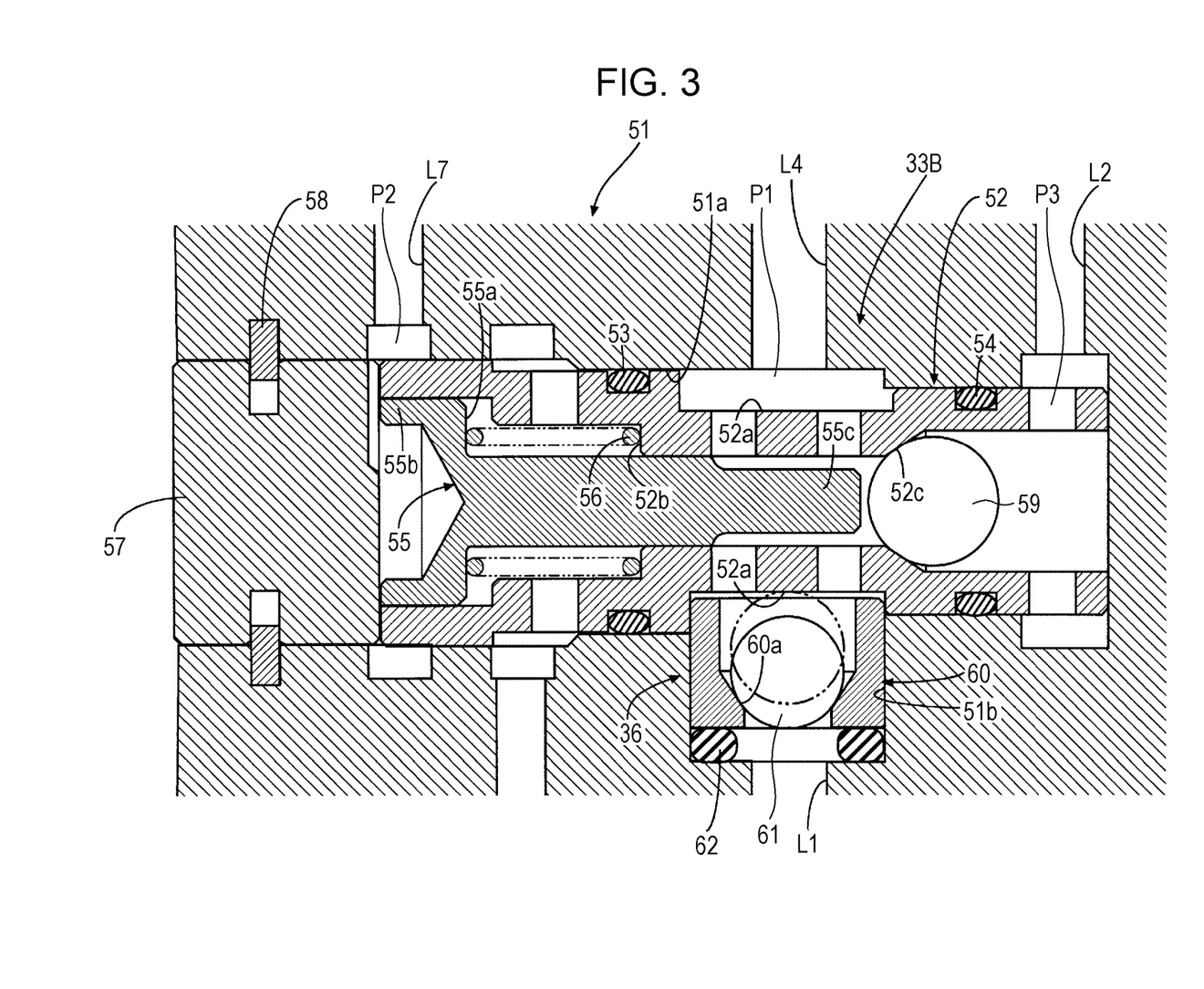
FIG. 3 is an enlarged view of a portion III in FIG. 2.

As is obvious from FIG. 3, the second ball valve 33B includes a first sleeve (a switching valve body) 52 that is fitted into a first valve hole (an inner surface) 51a formed in a valve body 51 of the hydraulic circuit 31. An annular recess (an outer peripheral surface) 52a defining a port (a switching valve inlet port) P1 connected to the oil passage L1 and the oil passage L4 is formed at an axially intermediate portion of the first sleeve 52. A pair of O-rings 53 and 54 supported on both sides with respect to the axial direction of the annular recess 52a are brought into contact with the inner circumferential surface of the first valve hole 51a, and the port P1 is thereby sealed. Because there is a small space between the inner circumferential surface of the first valve hole 51a and the outer circumferential surface of the first sleeve 52, the first sleeve 52 is supported by the pair of O-rings 53 and 54 in a floating manner so as to be radially movable with respect to the valve body 51.

A spool 55 is fitted into the first sleeve 52 such that the spool 55 can slide in the interior of the first sleeve 52 in the axial direction. A return spring 56 is compressedly provided between a step part 55a of the spool 55 and a step part 52b of the first sleeve 52. The first valve hole 51a is blocked at one end (left hand side in the figure) by a plug 57 and a circlip 58. A port P2 communicating with an oil chamber between the plug 57 and a larger-diameter end portion 55b on the left hand side of the spool 55 is connected to an output port of the solenoid valve 32E via an oil passage L7.

A valve seat 52c is formed on the other end side (right hand side in the figure) of the first sleeve 52, and a ball 59 is placed on the right hand side of the valve seat 52c so as to be movable in the axial direction. A smaller-diameter end portion 55c on the right hand side of the spool 55 faces the left hand side of the ball 59. When the spool 55 moves to the right, the ball 59 leaves the valve seat 52c, and the second ball valve 33B is opened. A port P3 is formed through the first sleeve 52 on the right hand side of the ball 59. The port P3 communicates with the oil passage L2.

A second valve hole 51b communicating with the oil passage L1 is formed in the valve body 51 so as to be perpendicular to the first valve hole 51a, and the check valve 36 is received in the second valve hole 51b. The check valve 36 is formed of a second sleeve (a check valve body) 60 and a ball (a check valve member) 61 that is placed so as to be movable in the axial direction in the interior (a check valve oil path) of the second sleeve 60 and can be seated on a valve seat (a check valve inlet port) 60a. A gap between the second sleeve 60 and the second valve hole 51b may be sealed by an O-ring 62. An end (including a check valve outlet port) of the second sleeve 60 is fitted into the annular recess 52a defining the port P1 of the first sleeve 52.

Accordingly, when the engine E is in operation, actuating the hydraulic pump P sufficiently increases the line pressure of the oil passage L1 and causes the check valve 36 to open, and the line pressure is transferred from the port P1 to the oil passage L4. The second ball valve 33B is then opened, the line pressure of the oil passage L1 is transferred to the oil passage L2 via the port P1 and the port P3, and the first and second accumulators 37 and 38 store the pressure.

The action of the embodiment with the above structure will now be described.

Figure 4:
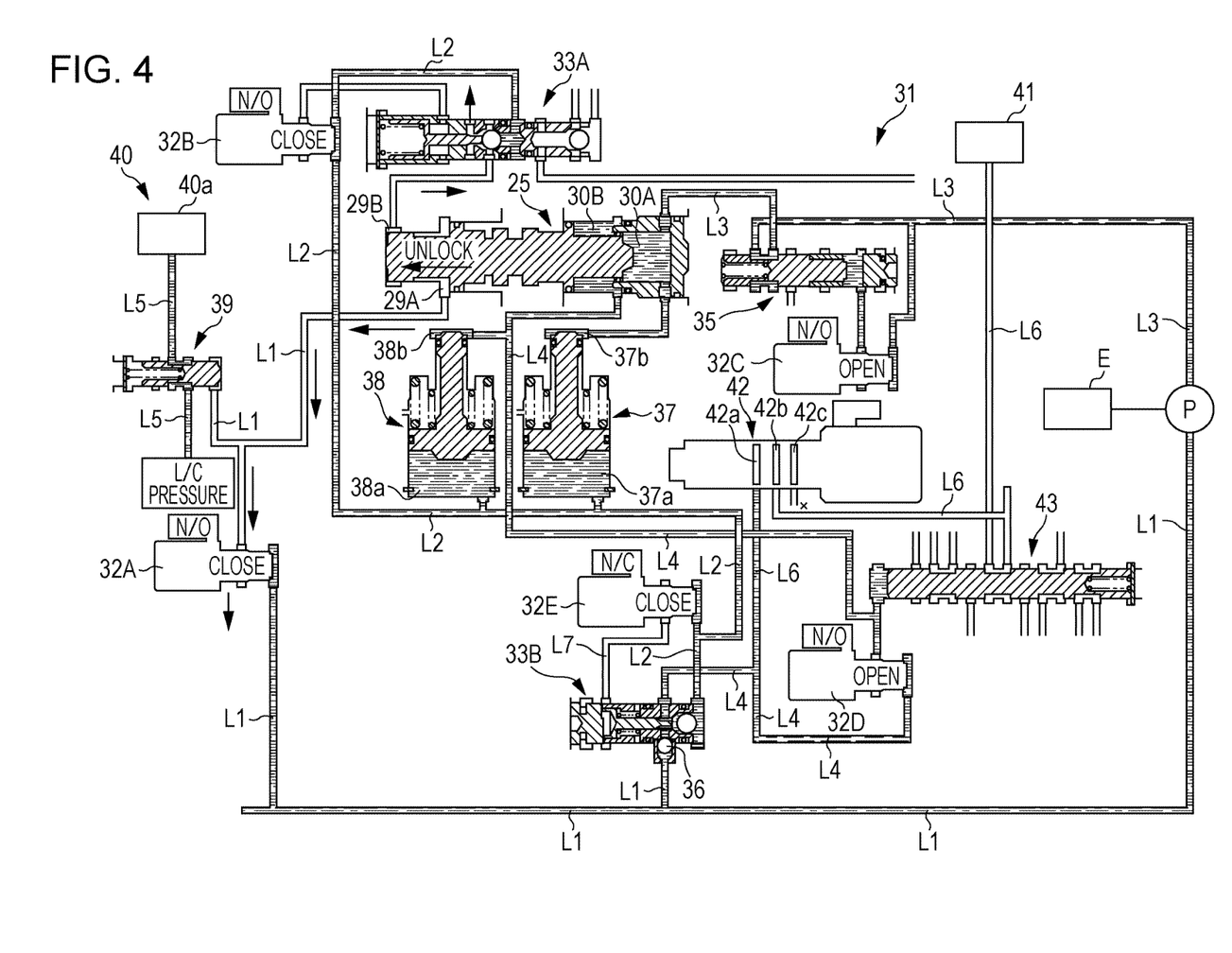
FIG. 4 is an explanatory diagram of actions performed when a vehicle is running in the D range or R range mode (and a parking lock is released).

As shown in FIG. 4, when a shift lever is set to the D-range or R-range to drive a vehicle in a predetermined transmission gear range, line pressure generated by the hydraulic pump P driven by the engine E is transferred to the oil passage L1 and the oil passage L3, and the hydraulic pressure of the oil passage L1 is transferred to the oil passage L4 and the oil passage L6 via the check valve 36. The second ball valve 33B is consequently opened so that the line pressure is applied from the oil passage L1 to the oil passage L2 and the hydraulic pressure is stored in the accumulating chamber 37a of the first accumulator 37 and the accumulating chamber 38a of the second accumulator 38.

The solenoid valve 32C and the solenoid valve 32D, which are of the normally open type, are opened when deactivated. Opening the solenoid valve 32C causes the spool of the parking inhibiting valve 35 to move to the left, thereby allowing the line pressure of the oil passage L3 to be transferred to the first unlock oil chamber 30A of the hydraulic actuator 25 via the parking inhibiting valve 35, and opening the solenoid valve 32D allows the line pressure of the oil passage L4 to be transferred to the second unlock oil chamber 30B of the hydraulic actuator 25.

Meanwhile, the solenoid valve 32A and the solenoid valve 32B, which are of the normally open type, are closed when activated. Closing the solenoid valve 32A allows oil in the first lock oil chamber 29A of the hydraulic actuator 25 to flow along a path shown by arrows and to be drained from the solenoid valve 32A. Closing the solenoid valve 32B causes the first ball valve 33A to close, thereby allowing oil in the second lock oil chamber 29B of the hydraulic actuator 25 to flow along a path shown by arrows and to be drained from the first ball valve 33A. The piston 27 of the hydraulic actuator 25 consequently moves to the left and the parking lock is released.

The flow rate of oil passable through the first ball valve 33A that is opened and closed by the solenoid valve 32B is comparatively large, whereas the flow rate of oil passable through the solenoid valve 32B is comparatively small. Accordingly, responsiveness of actuation of the hydraulic actuator 25 can be enhanced by interposing the first ball valve 33A.

Thus, while the vehicle is running, the parking lock can be released in a way that the hydraulic actuator 25 is actuated to be in an unlock position by closing the solenoid valve 32A and the solenoid valve 32B and opening the solenoid valve 32C and the solenoid valve 32D. At that time, because the hydraulic actuator 25 includes two lock oil chambers, namely, the first lock oil chamber 29A and the second lock oil chamber 29B, and two unlock oil chambers, namely, the first unlock oil chamber 30A and the second unlock oil chamber 30B, the hydraulic actuator 25 can be actuated to be in the unlock position without hindrance and redundancy can be ensured, even when one of the solenoid valve 32C and the solenoid valve 32D is stuck in the closed position and hence hydraulic pressure is not applied to the first unlock oil chamber 30A or the second unlock oil chamber 30B, or even when one of the solenoid valve 32A and the solenoid valve 32B is stuck in the open position and hence hydraulic pressure is applied to the first lock oil chamber 29A or the second lock oil chamber 29B.

The solenoid valve 32C opens when in a predetermined first transmission gear range, and the solenoid valve 32D opens when in a predetermined second transmission gear range. The predetermined first transmission gear range and the predetermined second transmission gear range partially overlap. Accordingly, the transmission gear range set at that moment determines whether line pressure is applied to only the first unlock oil chamber 30A, or line pressure is applied to only the second unlock oil chamber 30B, or line pressure is applied to both of the first unlock oil chamber 30A and the second unlock oil chamber 30B. In any case, however, the piston 27 of the hydraulic actuator 25 moves to the left and the parking lock is released without hindrance. In the overlapping transmission gear range, since line pressure is applied to both of the first unlock oil chamber 30A and the second unlock oil chamber 30B, the parking lock is maintained in the released state and redundancy is improved, even when application of the line pressure is stopped due to a failure of the solenoid valve 32C or the solenoid valve 32D.

Figure 5:
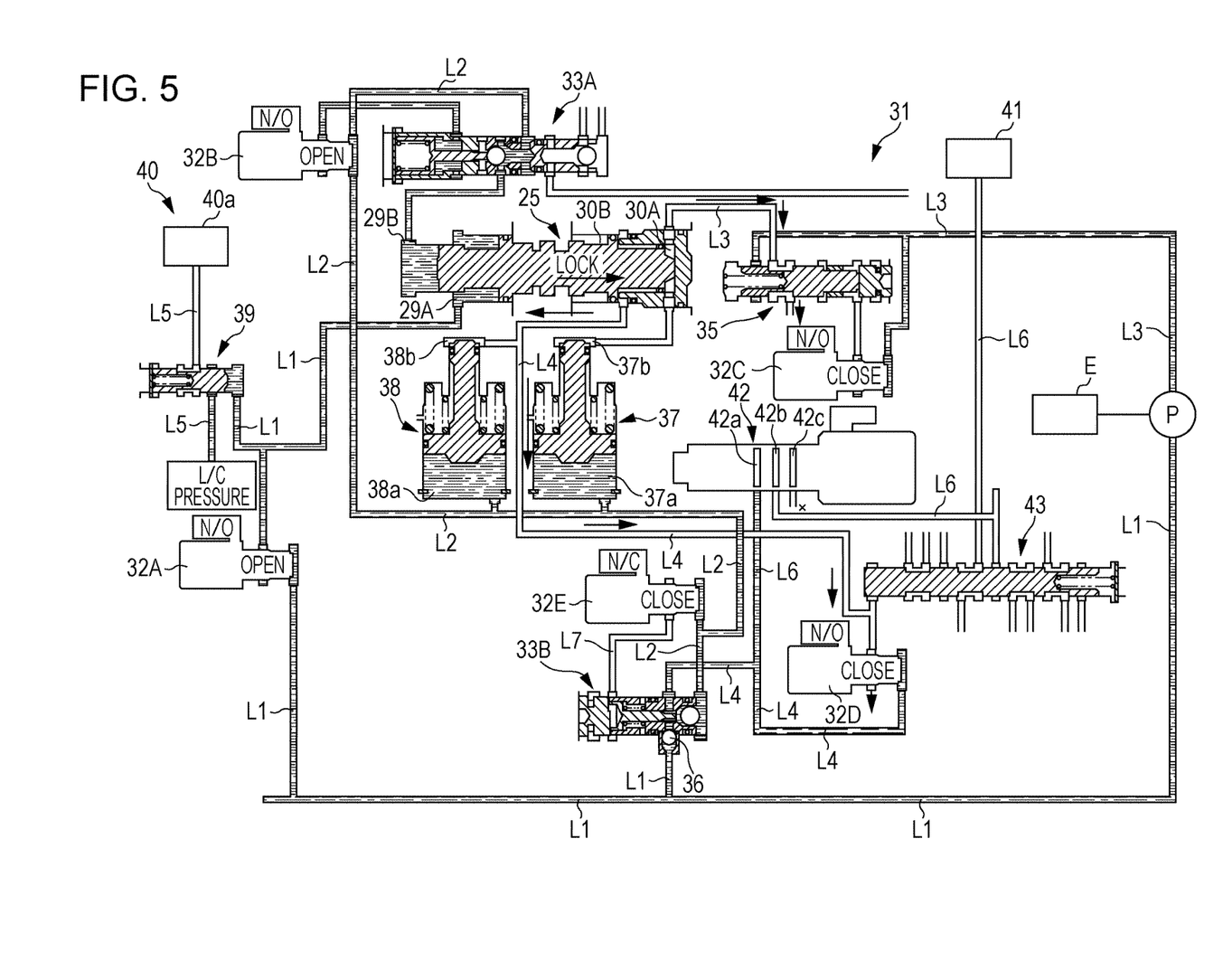
FIG. 5 is an explanatory diagram of actions performed when the vehicle is stopping in the P range mode with an engine on (and the parking lock is actuated).

As shown in FIG. 5, when the shift lever is set to the P-range to stop the vehicle while the engine E is operating, the solenoid valve 32A and the solenoid valve 32B are deactivated and opened, and the solenoid valve 32C and the solenoid valve 32D are activated and closed. Opening the solenoid valve 32A allows the line pressure of the oil passage L1 to be transferred to the first lock oil chamber 29A of the hydraulic actuator 25, and opening the solenoid valve 32B causes the first ball valve 33A to open, thereby allowing the line pressure of the oil passage L2 to be transferred to the second lock oil chamber 29B of the hydraulic actuator 25.

Meanwhile, closing the solenoid valve 32C allows oil in the first unlock oil chamber 30A of the hydraulic actuator 25 to flow along a path shown by arrows and to be drained from the parking inhibiting valve 35, and closing the solenoid valve 32D allows oil in the second unlock oil chamber 30B of the hydraulic actuator 25 to flow along a path shown by arrows and to be drained from the solenoid valve 32D. The piston 27 of the hydraulic actuator 25 consequently moves to the right and the parking lock is actuated.

Thus, when the shift lever is set to the P-range while the engine E is operating, the hydraulic actuator 25 can be actuated to be in a lock position by opening the solenoid valve 32A and the solenoid valve 32B and closing the solenoid valve 32C and the solenoid valve 32D. At that time, because the hydraulic actuator 25 includes two lock oil chambers, namely, the first lock oil chamber 29A and the second lock oil chamber 29B, and two unlock oil chambers, namely, the first unlock oil chamber 30A and the second unlock oil chamber 30B, the hydraulic actuator 25 can be actuated to be in the lock position without hindrance and redundancy can be ensured, even when one of the solenoid valve 32C and the solenoid valve 32D is stuck in the open position and hence hydraulic pressure is applied to the first unlock oil chamber 30A or the second unlock oil chamber 30B, or even when one of the solenoid valve 32A and the solenoid valve 32B is stuck in the close position and hence hydraulic pressure is not applied to the first lock oil chamber 29A or the second lock oil chamber 29B.

Figure 6:
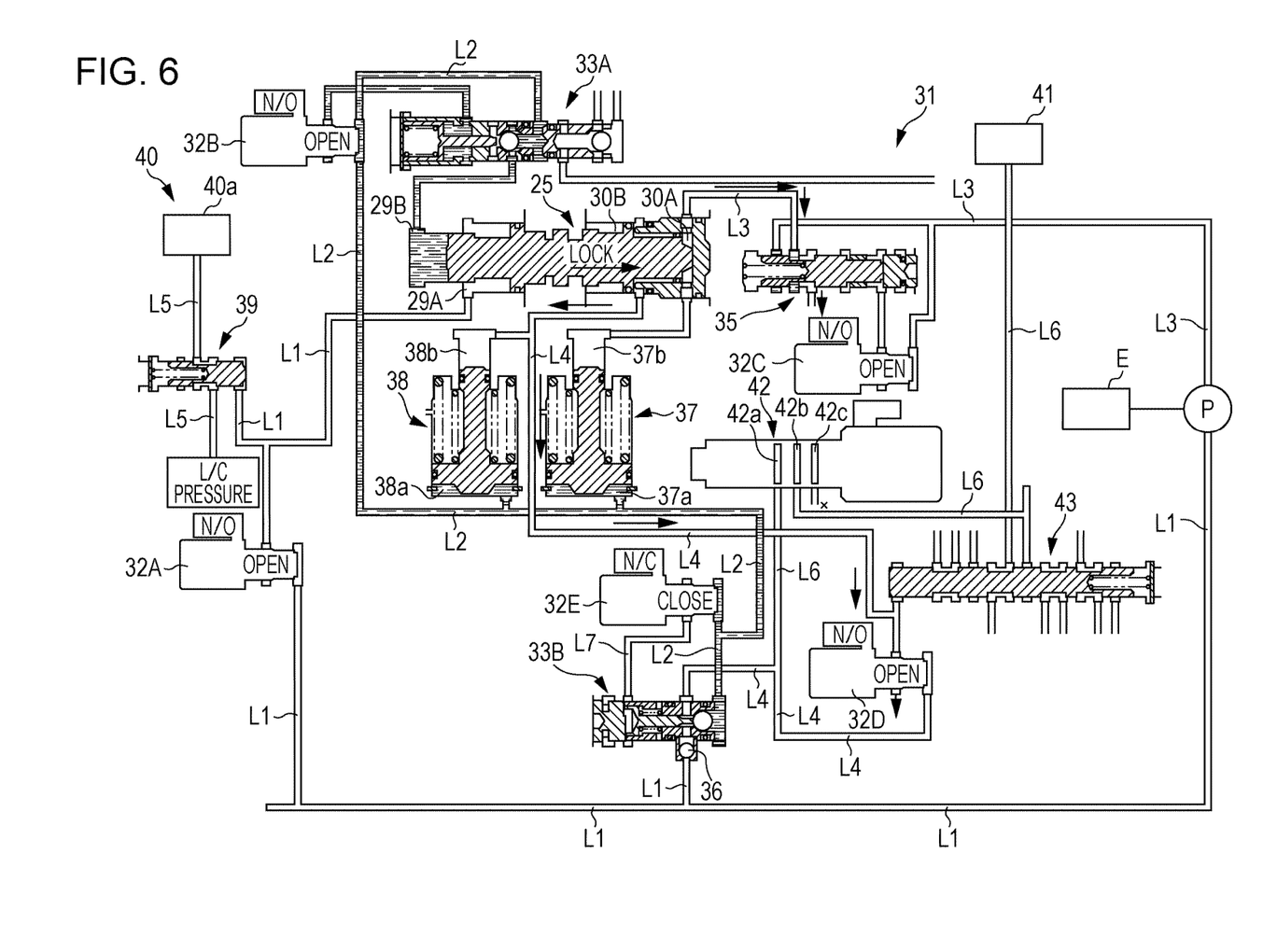
FIG. 6 is an explanatory diagram of actions performed when the engine is off (and the parking lock is actuated).

As shown in FIG. 6, when the shift lever is set to the P-range and an ignition is switched off, the line pressure is eliminated due to stopping of the engine E. According to the embodiment, however, the parking lock device can be actuated without hindrance by using the hydraulic pressure stored in the first accumulator 37 and the second accumulator 38.

More specifically, because all of the solenoid valve 32A, the solenoid valve 32B, the solenoid valve 32C, and the solenoid valve 32D, which are of the normally open type, are deactivated and opened when the ignition is off, the hydraulic pressure stored in the first accumulator 37 and the second accumulator 38 is maintained and does not leak as a result of the second ball valve 33B being closed even when the line pressure is eliminated.

Opening the solenoid valve 32B allows the hydraulic pressure of the first accumulator 37 and the second accumulator 38 to be transferred to the second lock oil chamber 29B of the hydraulic actuator 25 through the intermediation of the opened second ball valve 33B, closing the solenoid valve 32C allows the oil in the first unlock oil chamber 30A of the hydraulic actuator 25 to flow along a path shown by arrows and to be drained from the parking inhibiting valve 35, and closing the solenoid valve 32D allows the oil in the second unlock oil chamber 30B of the hydraulic actuator 25 to flow along a path shown by arrows and to be drained from the solenoid valve 32D. The piston 27 of the hydraulic actuator 25 consequently moves to the right and the parking lock is actuated.

Thus, the parking lock device can be actuated without hindrance by using the hydraulic pressure stored in the first accumulator 37 and the second accumulator 38, even when the line pressure is eliminated by setting the shift lever to the P-range and switching off the ignition.

Figure 7:
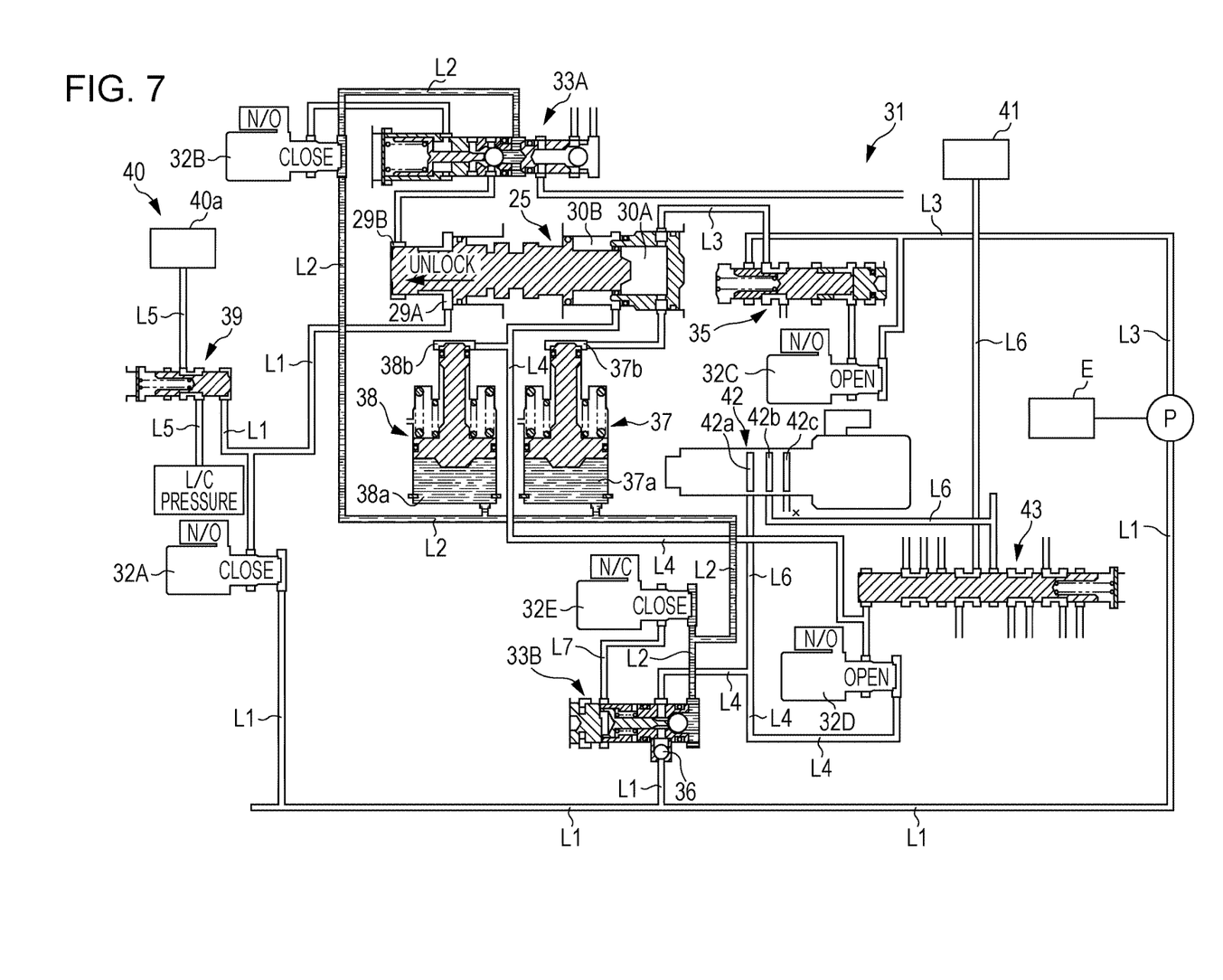
FIG. 7 is an explanatory diagram of actions performed during idle-stop control.

In the embodiment, the vehicle can be subjected to idle-stop control, under which line pressure is eliminated as a result of the engine E being stopped while the vehicle is temporarily stopped, for example, while waiting for a traffic light. During the idle-stop control, as shown in FIG. 7, the hydraulic pressure stored in the first accumulator 37 and the second accumulator 38 is maintained and does not leak as a result of the second ball valve 33B being closed. Although elimination of the line pressure leads to elimination of the hydraulic pressure of the first unlock oil chamber 30A and the second unlock oil chamber 30B of the hydraulic actuator 25, the parking lock is maintained in the released state by engaging the detent roller 22 with the detent plate 17.

When the engine E begins to operate at the time of a restart from the idle-stop control, the line pressure does not immediately increase sufficiently due to a delayed response of the hydraulic pump P. Accordingly, hydraulic pressure may not be applied to the hydraulic brake 41, which is a hydraulic engaging device required for starting, and a quick start may be impeded. According to the embodiment, however, the hydraulic brake 41 can be actuated without delay by using the hydraulic pressure of the first accumulator 37 and the second accumulator 38 that has been maintained during the idle-stop control.

Figure 8:
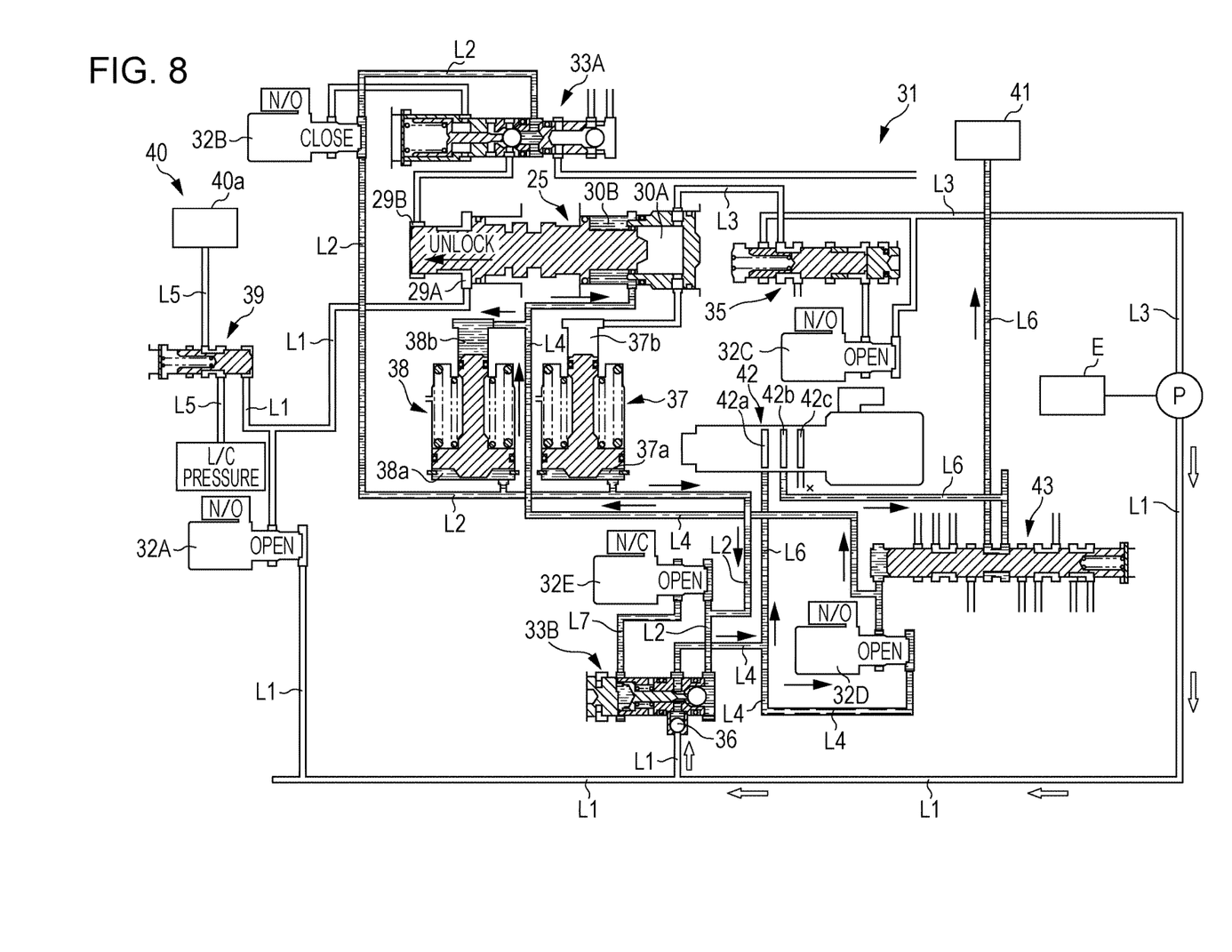
FIG. 8 is an explanatory diagram of actions performed at the time of a restart from the idle-stop control.

More specifically, as shown in FIG. 8, when the solenoid valve 32E is activated and opened to open the second ball valve 33B at the same time as the restart from the idle-stop control, the hydraulic pressure stored in the first accumulator 37 and the second accumulator 38 is applied to the oil passage L4 and the oil passage L6 via the second ball valve 33B from the oil passage L2. At that time, because the solenoid valve 32D installed in the oil passage L4 has been deactivated and opened, the spool of the brake cut valve 43 has moved to the right. Accordingly, when the linear solenoid valve 42 installed in the oil passage L6 is opened at a predetermined degree of opening, the hydraulic pressure stored in the first accumulator 37 and the second accumulator 38 can be applied to the hydraulic brake 41 to start the vehicle rapidly.

When the hydraulic pressure from the first and second accumulators 37 and 38 is transferred from the port P3 to the port P1 of the second ball valve 33B, the check valve 36 is maintained in the open state because the line pressure of the oil passage L1 does not sufficiently increase due to a delayed response of the hydraulic pump P, and the hydraulic pressure from the first and second accumulators 37 and 38 is prevented from leaking to the oil passage L1 on the side of the hydraulic pump P through the check valve 36.

The flow rate of oil passable through the second ball valve 33B that is opened and closed by the solenoid valve 32E is comparatively large, whereas the flow rate of oil passable through the solenoid valve 32E is comparatively small. Accordingly, the responsiveness of application of the hydraulic pressure from the first accumulator 37 and the second accumulator 38 can be enhanced by interposing the second ball valve 33B, and the hydraulic brake 41 can be engaged rapidly.

As shown by outlined arrows in FIG. 8, when the engine E begins to operate by being restarted from the idle-stop control, the hydraulic pump P is actuated after some delay, and then the line pressure of the oil passage L1 sufficiently increases. This line pressure causes the check valve 36 to open, and the first and second accumulators 37 and 38 store the pressure again. The transition to the running state of the vehicle then takes place as shown in FIG. 4.

When the line pressure of the oil passage L1 rapidly increases due to the actuation of the hydraulic pump P and the check valve 36 is opened, as shown by a dashed line in FIG. 3, the ball 61 of the check valve 36 that has rapidly left the valve seat 60a may collide with the bottom (a receiving surface) of the annular recess 52a of the first sleeve 52 of the second ball valve 33B, and a noise may be created. According to the embodiment, however, because the first sleeve 52 of the second ball valve 33B is supported by the pair of O-rings 53 and 54 in a floating manner in the first valve hole 51a of the valve body 51, the impact due to the collision of the ball 61 of the check valve 36 can be absorbed by the elasticity of the O-rings 53 and 54, and the noise can be reduced.

In addition, because one end of the second sleeve 60 of the check valve 36 is fitted into the annular recess 52a of the first sleeve 52 of the second ball valve 33B, positioning of the first sleeve 52 in the axial direction can be achieved without a particular component for positioning.

Although the embodiment has been described above, various design alterations may be carried out without departing from the concept of the embodiment.

For example, the alternations are not limited to the annular recess 52a according to the embodiment, and a recess as a hole extending in the radial direction is acceptable.

A second ball valve 33B in the embodiment corresponds to the switching valve. A first accumulator 37 and a second accumulator 38 in the embodiment correspond to the accumulator. A first sleeve 52 in the embodiment corresponds to the sleeve of the switching valve. An annular recess 52a in the embodiment corresponds to the recess. A second sleeve 60 in the embodiment corresponds to the sleeve of the check valve. A ball 61 of a check valve 36 in the embodiment corresponds to the valve member. Oil passages L1 and L2 in the embodiment correspond to the first oil passage. An oil passage L4 in the embodiment corresponds to the second oil passage.

According to a first aspect of an embodiment, a hydraulic control apparatus of an automatic transmission includes an engine on which idle-stop control is performed in a predetermined running state; a hydraulic pump that is driven by the engine; an accumulator that stores hydraulic pressure that is to be applied to a hydraulic actuator of the automatic transmission connected to the engine; a first oil passage through which hydraulic pressure from the hydraulic pump is applied to the accumulator; a check valve that is placed in the first oil passage and opened only in a direction in which the hydraulic pressure from the hydraulic pump is applied to the accumulator; a switching valve that is placed between the check valve in the first oil passage and the accumulator and allows the hydraulic pressure from the accumulator to be applied to a second oil passage connected to the hydraulic actuator; and a valve body in which at least the accumulator, the check valve, and the switching valve are accommodated. The switching valve and the check valve are placed such that an axis of a sleeve of the switching valve is perpendicular to an axis of a sleeve of the check valve. The sleeve of the switching valve is supported by the valve body with a pair of O-rings interposed therebetween, which surround the sleeve at positions spaced apart from each other in an axial direction of the sleeve. One end of the sleeve of the check valve is fitted into a recess formed between the pair of O-rings on the sleeve of the switching valve. A valve member of the check valve comes into contact with a bottom of the recess when the check valve is opened.

A second ball valve 33B in the embodiment corresponds to the switching valve. A first accumulator 37 and a second accumulator 38 in the embodiment correspond to the accumulator. A first sleeve 52 in the embodiment corresponds to the sleeve of the switching valve. An annular recess 52a in the embodiment corresponds to the recess. A second sleeve 60 in the embodiment corresponds to the sleeve of the check valve. A ball 61 of a check valve 36 in the embodiment corresponds to the valve member. Oil passages L1 and L2 in the embodiment correspond to the first oil passage. An oil passage L4 in the embodiment corresponds to the second oil passage.

With a structure according to the first aspect of the embodiment, line pressure generated by the hydraulic pump while the engine is in operation is stored in the accumulator via the opened check valve. When the engine is in the idle-stop state, although the hydraulic pump is stopped and application of the line pressure is stopped, the hydraulic actuator can be actuated without hindrance by applying the hydraulic pressure stored in the accumulator to the hydraulic actuator via the check valve, even while the hydraulic pump is stopped. The check valve is then closed to prevent the hydraulic pressure stored in the accumulator from leaking to the stopped hydraulic pump side.

When the engine is restarted from the idle-stop state and begins to operate to actuate the hydraulic pump and the line pressure sufficiently increases, the valve member of the closed check valve may rapidly open against the hydraulic pressure from the accumulator and may create a noise due to an impact caused thereby. However, because the switching valve and the check valve are placed such that the axis of the sleeve of the switching valve is perpendicular to the axis of the sleeve of the check valve, the sleeve of the switching valve is supported by the valve body with the pair of O-rings interposed therebetween, which surround the sleeve at positions spaced apart from each other in the axial direction, and one end of the sleeve of the check valve is fitted into the recess formed between the pair of O-rings on the sleeve of the switching valve, even though the valve member collides with the bottom of the recess when the check valve is opened, the impact caused thereby is relieved by the pair of the O-rings and prevented from being transferred directly to the valve body, resulting in a reduction in noise. In addition, positioning of the first sleeve in the axial direction can be achieved without a particular component for positioning in a way that one end of the second sleeve of the check valve is fitted into the recess of the first sleeve of the switching valve.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic control apparatus for an automatic transmission comprising:
an engine on which idle-stop control is performed in a predetermined running state;
a hydraulic pump that is driven by the engine;
an accumulator that stores hydraulic pressure that is to be applied to a hydraulic actuator for the automatic transmission connected to the engine;
a first oil passage through which hydraulic pressure from the hydraulic pump is applied to the accumulator;
a check valve that is placed in the first oil passage and opened only in a direction in which the hydraulic pressure from the hydraulic pump is applied to the accumulator;
a switching valve that is placed between the check valve and the accumulator in the first oil passage and allows the hydraulic pressure from the accumulator to be applied to a second oil passage connected to the hydraulic actuator; and
a valve body in which at least the accumulator, the check valve, and the switching valve are accommodated,
wherein the switching valve and the check valve are placed such that an axis of a sleeve of the switching valve is perpendicular to an axis of a sleeve of the check valve,
wherein the sleeve of the switching valve is supported by the valve body with a pair of O-rings interposed therebetween, the O-rings surrounding the sleeve at positions spaced apart from each other in an axial direction of the sleeve,
wherein one end of the sleeve of the check valve is fitted into a recess formed between the pair of O-rings on the sleeve of the switching valve, and
wherein a valve member of the check valve comes into contact with a bottom of the recess when the check valve is opened.

2. The hydraulic control apparatus according to claim 1, wherein the sleeve of the switching valve is supported by the pair of O-rings in a floating manner so as to be movable in a radial direction of the pair of O-rings.

3. A hydraulic control apparatus comprising:
a hydraulic actuator to control an automatic transmission;
a hydraulic pump to be driven by an engine to provide hydraulic pressure;
an accumulator to which the hydraulic pressure is supplied while the hydraulic pump provides the hydraulic pressure, the hydraulic pressure stored in the accumulator being provided to the hydraulic actuator while the hydraulic pump does not provide the hydraulic pressure;
a check valve provided between the hydraulic pump and the hydraulic actuator to open while the hydraulic pump provides the hydraulic pressure and to close while the hydraulic pump does not provide the hydraulic pressure;
a first oil providing route connecting the hydraulic pump to the check valve;
the check valve comprising:
a check valve body comprising:
a check valve inlet port connected to the first oil providing route;
a check valve outlet port; and
a check valve oil path connecting the check valve inlet port to the check valve outlet port; and
a check valve member movable in the check valve oil path to move in a first direction in which the check valve member is pushed by hydraulic fluid due to the hydraulic pressure from the hydraulic pump to open the check valve inlet port while the hydraulic pump provides the hydraulic pressure;
a switching valve joined to the check valve, provided between the check valve and the hydraulic actuator to open while the engine works and to close while the engine does not work;
a second oil providing route connecting the switching valve to the hydraulic actuator;
a third oil providing route connecting the switching valve to the accumulator, the first providing route being connected to at least one of the second oil providing route and the third oil providing route while the check valve is open, the first oil providing route being disconnected from both the second oil providing route and the third oil providing route while the check valve is close, the third oil providing route being connected to at least the second oil providing route while the switching valve is open, the third oil providing route being disconnected from both the first oil providing route and the second oil providing route while the switching valve is close;
the switching valve comprising a switching valve body comprising:
a switching valve inlet port connected to the check valve outlet port;
an outer peripheral surface on which the switching valve inlet port is provided; and
a receiving surface facing the check valve outlet port and being adjacent to the switching valve inlet port, the check valve member contacting the receiving surface after the hydraulic pump starts providing hydraulic pressure;
a valve body in which the check valve and the switching valve are provided, the valve body comprising an inner surface facing the outer peripheral surface of the switching valve, the inner surface of the valve body and the outer peripheral surface of the switching valve providing a gap between the valve body and the switching valve;
a first O-ring arranged on the outer peripheral surface; and
a second O-ring arranged on the outer peripheral surface, the check valve outlet port and the switching valve inlet port being interposed between the first O-ring and the second O-ring to seal the gap, the switching valve body being supported by the valve body via the first O-ring and the second O-ring such that the switching valve body is movable in the first direction.

4. The hydraulic control apparatus according to claim 3, wherein the switching valve body is supported by the first O-ring and the second O-ring in a floating manner.

5. The hydraulic control apparatus according to claim 3, wherein the check valve body comprises a first end on which the check valve outlet port is provided and the outer peripheral surface comprises a recess into which the first end is fitted.

6. The hydraulic control apparatus according to claim 3, wherein the accumulator is provided in the valve body and the check valve is placed such that an axis of the switching valve body is perpendicular to an axis of the check valve body.

* * * * *